Patented Jan. 14, 1930

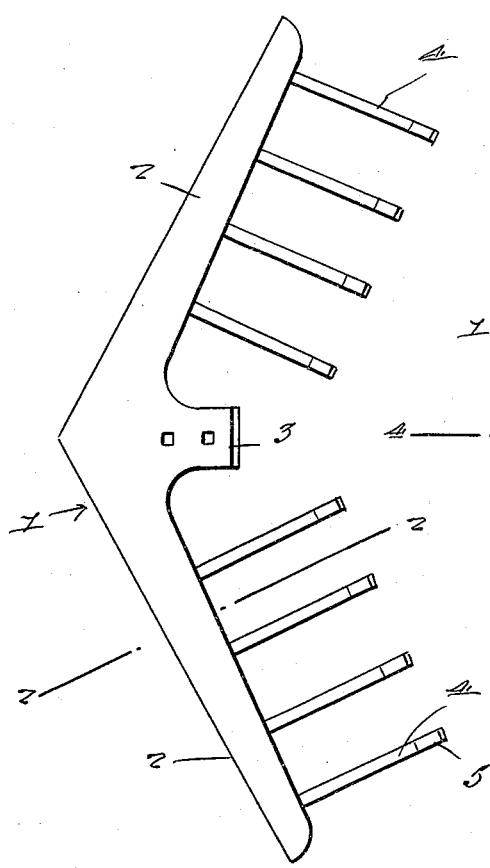
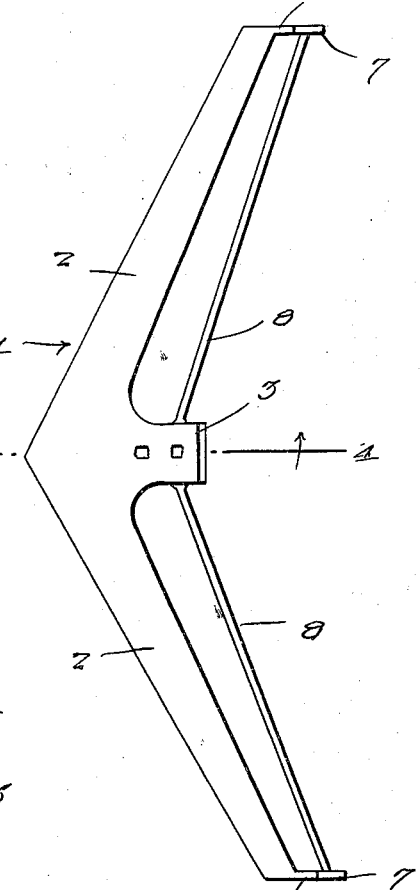
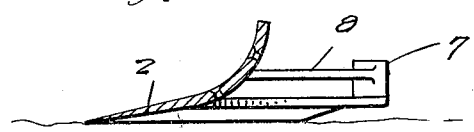
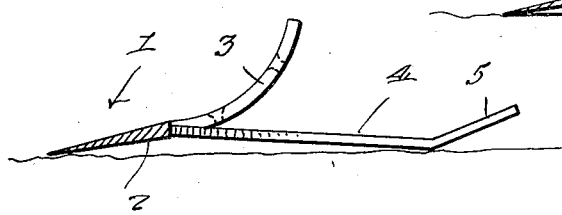

1,743,296

UNITED STATES PATENT OFFICE

ALBERT WEAVER, OF BIRD CITY, KANSAS

WEED CUTTER

Application filed March 5, 1927. Serial No. 173,058.

This invention relates to an improved weed cutter, and it has more particular reference to a cutter of the type including a body of general V-shaped design constructed to provide a pair of rearwardly and outwardly diverging cutting blades with a draft connection at the center.

The principal improvement resides in the provision of supplemental means carried by and disposed rearwardly of the body for loosening the weed roots and simultaneously pulverizing and tilling the soil, as the cutter is drawn over the surface.

More specifically, I propose to provide a weed cutter of the class described, with integral means disposed rearwardly of the cutting edges and diagonally to the line of draft, which means is such as to substantially tear the weed roots loose from the lump soil to practically destroy and eradicate the weeds and to thereby obviate prompt re-growth.

The particular details as well as more specific advantages derived therefrom will become apparent from the following description and drawings.

In the drawings:—

Figure 1 is a top plan view of one embodiment of the invention.

Fig. 2 is a section taken approximately on the plane of the line 2—2 of Fig. 1.

Fig. 3 is a top plan view of a different embodiment of the invention.

Fig. 4 is a section on the line 4—4 of Fig. 3.

In both forms of the invention, the weed cutter proper is the same in construction. It is generally designated by the reference character 1, and as before indicated it comprises a single metal body of general V-shaped design including a pair of symmetrical rearwardly and outwardly diverging cutters or blades 2. The blades are preferably of the cross sectional shape shown in Fig. 2, the forward edge being tapered to a fine feather cutting edge, which lies in intimate contact with the surface of the ground.

The central portion of the body is widened somewhat, and provided with an upstanding shank 3 to which the draft connection (not shown) is connected in any appropriate manner. This centralizes the pull and insures uniform action.

By confining attention at this time to Figs. 1 and 2, it will be observed that the supplemental means referred to here comprises two sets of pulverizing and eradicating fingers 4. Each finger comprises an elongated flat strip of metal which extends at substantial right angles from the blade and terminates in an upturned extremity 5 at its rear end. While these fingers are shown in flat cross section, I wish to point out they may be of some other cross section, for instance, round or square.

By disposing the fingers at right angles to the longitudinal axis of each blade, they are thereby located diagonally with respect to the line of draft. The respective fingers are spaced apart the approximate distance as represented in the drawings.

Noting now Figs. 3 and 4, it will be observed that the supplemental means comprises rearward extensions 6 formed on the outer ends of the blades, these extensions carrying upstanding lugs 7 to which rods 8 are connected at their outer ends. The inner ends of these rods are connected through the shank 3.

It will be noticed that the rods are disposed on a plane slightly above the cutting edges of the blades, which is also true of the extensions 6 which in a sense operate as shoes.

From the foregoing description it will be seen that I have evolved and produced an exceptionally novel construction, of the class described, which is characterized in one instance by a supplemental means which stabilizes and reinforces the structure. In addition, it operates as a drag to prevent the blades and especially the rearmost points from digging too deep in the ground. In fact, it tends to uniform the cutting operation of the blade from end to end.

In addition, the structure is advantageous in that it loosens the ground in which the weeds roots have been cut off and it causes the roots to die. The prongs or fingers being at right anges to the blades insures movement through the soil. In fact, it disturbs the soil to such an extent as to practically insure destruction of the roots.

Another feature is based upon the fact that the prongs being diagonal, to the line of draft, tend to push or exert a forward force on the blades and to lessen the impact encountered by the blades in cutting through the ground. In addition, the pulverizing means extends for the full width of the cutter and fully treats the surface from which the weed heads have been severed.

The rod construction, in addition to acting as a disturber of the ground also prevents the blades from going too deep into the ground by operating somewhat as a depth gauge. The service offered by a construction of this class is substantially equal to that of a comparatively heavy plow, which is the only instrument known for effectively cutting the weeds and practically destroying the weed roots after they have been cut. However, a plow is difficult and uncomfortable to handle, whereas the present device is very light and easy to manipulate and is practically automatic in its operation.

It is believed that after the foregoing description is considered carefully with the drawings, a clear understanding of the invention as well as the features and advantages will be had. Therefore, a more lengthy description is thought unnecessary.

While the preferred embodiments of the invention have been shown and described, it is to be understood that minor changes coming within the field of invention claimed may be resorted to if desired.

Having thus described my invention, what I claim as new is:—

In a weed cutter of the class described, a substantially V-shaped body having outwardly diverging portions of general V-shaped cross section and adapted to extend obliquely beneath the surface of the ground, the forward edges of said outwardly diverging portions being sharpened to provide cutting edges, a draft connection located at the apex portion of the body, a plurality of longitudinally spaced elongated fingers attached to the rear edges of the diverging portions of said body and disposed at approximate right angles thereto in order that said fingers may be located diagonally with respect to the line of draft, said fingers inclining rearwardly and downwardly for diagonal movement beneath the soil worked by the diverging portions of said body and constituting an agitating means for the worked soil, said fingers having upturned rear extremities extending to a point above the plane of the highest points of said diverging portions, for separating the weeds from the soil.

In testimony whereof I affix my signature.

ALBERT WEAVER.